United States Patent
Harris et al.

(10) Patent No.: US 7,558,560 B2
(45) Date of Patent: Jul. 7, 2009

(54) SYSTEM AND METHOD FOR INITIATING COMMUNICATIONS BETWEEN MOBILE STATIONS

(75) Inventors: John M. Harris, Chicago, IL (US); Ronald T. Crocker, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 535 days.

(21) Appl. No.: 11/304,093

(22) Filed: Dec. 15, 2005

(65) Prior Publication Data
US 2007/0207825 A1 Sep. 6, 2007

(51) Int. Cl.
*H04M 1/725* (2006.01)
(52) U.S. Cl. .................. 455/412.2; 455/418
(58) Field of Classification Search .......... 455/518, 455/519, 412.2, 466
See application file for complete search history.

(56) References Cited

U.S. PATENT DOCUMENTS

| 6,606,660 | B1 | 8/2003 | Bowman-Amuah | |
|---|---|---|---|---|
| 6,662,010 | B1 | 12/2003 | Tseiltlin et al. | |
| 6,826,707 | B1 | 11/2004 | Stevens | |
| 2003/0153341 | A1* | 8/2003 | Crockett et al. | 455/519 |
| 2005/0117529 | A1 | 6/2005 | Ramos-Escano et al. | |
| 2006/0087982 | A1* | 4/2006 | Kuure et al. | 370/252 |
| 2006/0142020 | A1* | 6/2006 | Mueckenheim et al. | 455/453 |

* cited by examiner

*Primary Examiner*—Tu X Nguyen

(57) ABSTRACT

A stream of packets is monitored. When a first packet in the stream of packets is detected to be destined for a target mobile station (110), the first packet is intercepted. Subsequently, a small initialization packet is sent to the target mobile station (110). The small initialization packet structured to inform the target mobile station (110) of an identity of an originating application that is initiating a communication session with the target mobile station (110).

7 Claims, 4 Drawing Sheets

SYSTEM AND METHOD FOR INITIATING COMMUNICATIONS BETWEEN MOBILE STATIONS

FIELD OF THE INVENTION

The field of the invention relates to communications made between mobile stations in networks and, more specifically, to initiating communications between mobile stations in these networks.

BACKGROUND OF THE INVENTION

Mobile stations communicate with each other across various types of networks. In some networks, a tone or beep is transmitted to a mobile station to indicate that a connection has been made and communications can begin. "Falsing" occurs when a tone or beep is sent to the originating mobile station, but the target mobile station is not available or is otherwise unable to receive the tone/audio. The target mobile station may not be available because the mobile station is busy, the power is turned off, the mobile station has moved, or for other types of reasons or situations.

Previous systems attempted to minimize the problem of falsing in various ways. For example, in one previous approach, the originating mobile station first transmitted a page request to the target mobile station. The target mobile station received the page request and sent a page response back to the originating mobile station. The originating mobile station then responded by transmitting an INVITE message to the target mobile station. Finally, the target mobile station received the INVITE message and responded by sending an OK message to the originating mobile station. A tone was then sent to the originating mobile station. This approach reduced falsing since it required that the target mobile station be actually available before a tone was sent to the originating mobile station. Unfortunately, it was also slow, consumed significant amounts of system resources, and tended to degrade the performance of the system.

In another previous approach, an INVITE message was delivered over a Forward Data Over Signal (F-DOS) link to a target mobile station and an OK message was subsequently generated at the target mobile station and sent back to the originating mobile station using a Reverse Data Over Signal (R-DOS) link. While reducing the problem of falsing, this approach unfortunately negatively impacted the paging capacity of the system by consuming significant amounts of valuable system resources.

In still another previous approach, the target mobile station was paged and the target mobile station transmitted an OK message over the R-DOS link. This method verified that the target mobile station was available before a tone was sent to the originating mobile station. However, this approach also often caused unacceptable reverse link loading and this loading adversely affected system performance.

Consequently, previous approaches that reduced falsing in networks also required too much time to complete, negatively impacted paging, and/or increased loading in the system to unacceptable levels. These effects, in turn, negatively impacted the service quality associated with communications made within the network, thereby increasing user frustration with the performance of the system.

Figure 1:
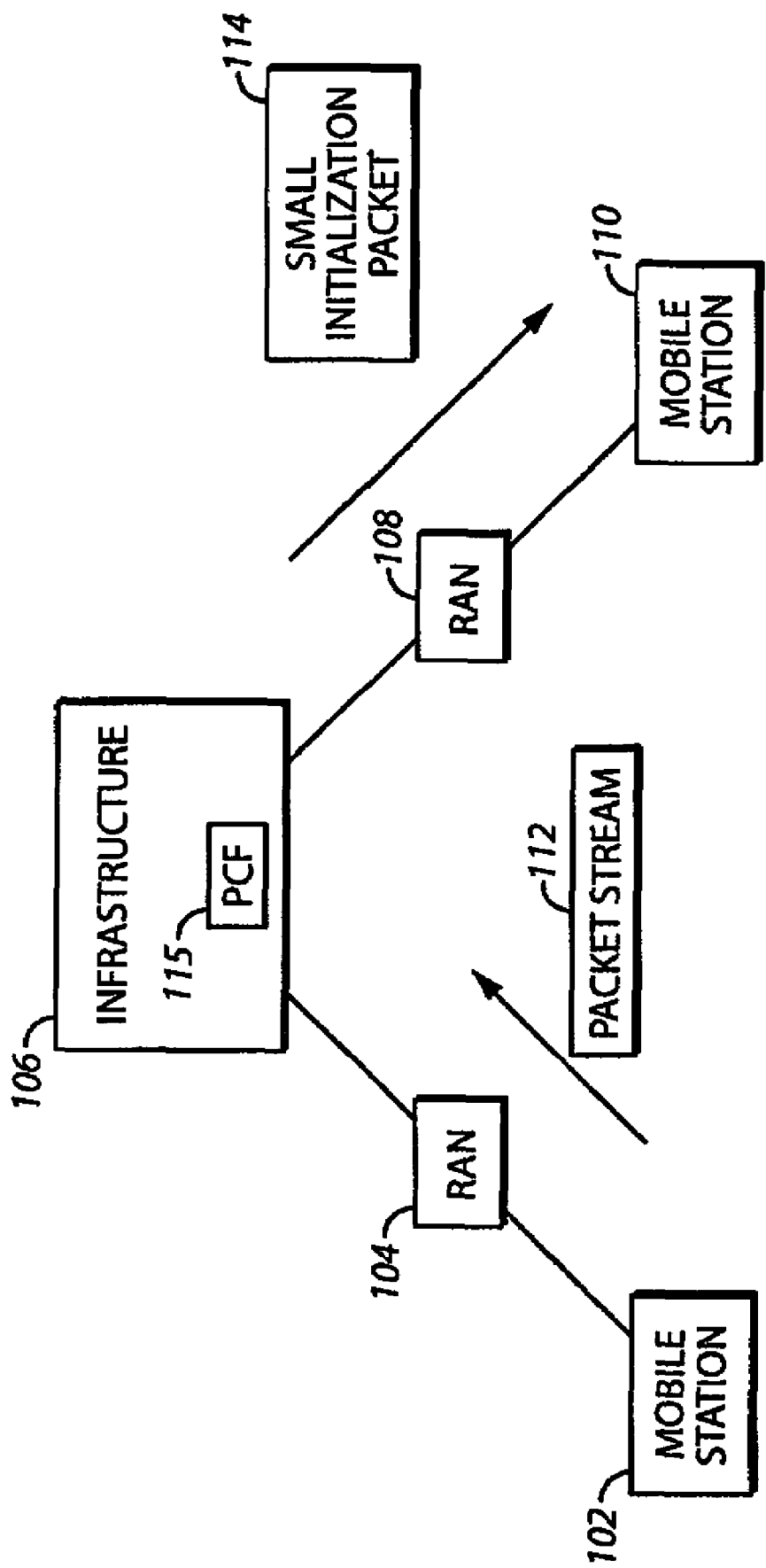
FIG. 1 is a block diagram of a system for initiating communications between mobile stations according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method are provided that minimize falsing in communication systems. The approaches described herein provide for the transmission of a small initialization packet to a target mobile station to which an originating user wishes to establish communications. The use of a small initialization packet allows communications to be established quickly and efficiently, without the need to send longer packets or perform long messaging sequences. Consequently, the consumption of substantial amounts of system resources is avoided, and user satisfaction with the performance of the system is enhanced. These approaches are applicable to various types of systems such as Push-to-Talk (PTT) services, cellular services, Universal Mobile Telecommunications System (UMTS) compliant systems, Mobile Broadband Wireless Access (MBWA) compliant systems, and Short Data Burst (SDB) over Code Division Multiple Access (CDMA) 2000 compliant systems to name a few.

In many of these embodiments, a stream of packets is monitored. When a first packet in the stream of packets is detected that is destined for a target mobile station, this first packet is intercepted and, subsequently, a small initialization packet is sent to the target mobile station. The small initialization packet is structured to inform the target mobile station of the identity of the application that is initiating the communication session with the target mobile station.

The small initialization packet may assume a number of forms. For example, the small initialization packet may be a zero byte packet or a Reservation-on packet. When a zero byte packet, the packet may only include a radio header and the actual packet payload has been omitted (i.e., has zero length). Other examples of small initialization packets are possible.

In others of these embodiments, a service associated with the communication session may be determined from information contained in the stream of packets. Once the type of service has been determined, a small initialization packet may be a sent in place of the first packet to the target mobile station only when the type of service is of a predetermined type. On the other hand, a paging message may be sent to the target mobile station when it is determined that the type of service is not of the predetermined type.

In still others of these embodiments, the small initialization packet is received, for example, at a target mobile station. The identity of the originating application is then determined from information associated with the small initialization packet. Subsequently, the application is notified of a receipt of the small initialization packet. Application-specific behavior is performed after the notification is received by the application. In one example, the application-specific behavior comprises sending a response packet to a known destination (such as a server).

Thus, approaches are provided that minimize falsing in communication systems by utilizing small initialization packets. The approaches described herein are efficient, do not consume substantial amounts of system resources, and enhance user satisfaction with the performance of the system.

Referring now to FIG. 1, one example of a system for initiating communications using small initialization packet is described. A mobile station 102 is coupled to a Radio Access Network (RAN) 104, which is, in turn, coupled to a telecommunication infrastructure 106. A mobile station 110 is coupled to a RAN 108, which is, in turn coupled to the infrastructure 106.

The mobile stations 102 and 110 may be any type of mobile communication station. For example, the mobile stations 102 and 110 may be cellular telephones, pagers, personal computers, or personal digital assistants (PDAs). Other examples of mobile stations are possible.

The RANs 104 and 108 include functionality that allows the mobile stations 102 and 110 to communicate with the infrastructure 106 and with each other. For example, the RANs 104 and 108 may include base stations and Base Station Controllers (BSCs) that support this functionality. Other elements may also be included within the RANs 104 and 108.

The infrastructure 106 includes functionality that routes communications between the RANs 104 and 108. In this regard, the infrastructure 106 may include switches and servers. The infrastructure may also include a Packet Control Function (PCF) 115 that monitors packets destined for an identified target mobile station. If the PCF 115 detects an appropriate packet, it may then deliver a small initialization packet to the target mobile station. The small initialization packet, in one approach, is transmitted over the paging channel (PCH). In addition or in place of the elements described above, other elements may also be included within the infrastructure 106.

Other conditions may also be tested to determine whether to examine a packet. For example, all packets may be examined when the paging channel is loaded. In another example, the status of different flows occurring within the network may be examined. In another example, only certain packet types such as Session Initiation Protocol (SIP) INVITE messages may be checked.

When the target mobile station receives the small initialization packet, it may inform the originating application that the packet has been received. When the application receives the notification, the application may then transmit a message to a server. The server then immediately initiates a Talk Permit Tone (TPT) to the originator and a communication session can begin between the originating mobile station and the target mobile station.

In one example of the operation of the system of FIG. 1, a stream of packets is monitored at the PCF 115 in the infrastructure 106. When a first packet in the stream of packets is detected that is destined for a target mobile station 110, this first packet is intercepted and, subsequently, a small initialization packet is sent to the target mobile station 110. The small initialization packet is structured to inform the target mobile station 110 of the identity of the application that is initiating the communication session.

In this example, the small initialization packet may assume a variety of forms. For example, the small initialization packet may be a zero byte packet or a Reservation-on packet. Additional examples of small initialization packets are possible.

Alternatively, a service type associated with the communication session may be determined from information in the stream of packets. The small initialization packet may be a sent in place of the first packet only when the type of service is of a predetermined type. On the other hand, a paging message when it is determined that the type of service is not of some predetermined type. In one example of this approach, a small initialization packet may be sent when the service type is e-mail. On the other hand, for all other service types, a paging message may be sent to the target mobile station instead of the small initialization packet.

In another example of the operation of the system of FIG. 1, a small initialization packet is received at the target mobile station 110. The identity of the application (e.g., an e-mail application) is determined from information associated with the small initialization packet. The application is notified of the receipt of the small initialization packet. Subsequently, application-specific behavior is performed after the notification is received by the application. In one example, the application-specific behavior comprises sending a response packet to a server within the infrastructure 106. Subsequently, the server can transmit a Talk Permit Tone (TPT) to the originator and the communication can occur.

Figure 2:
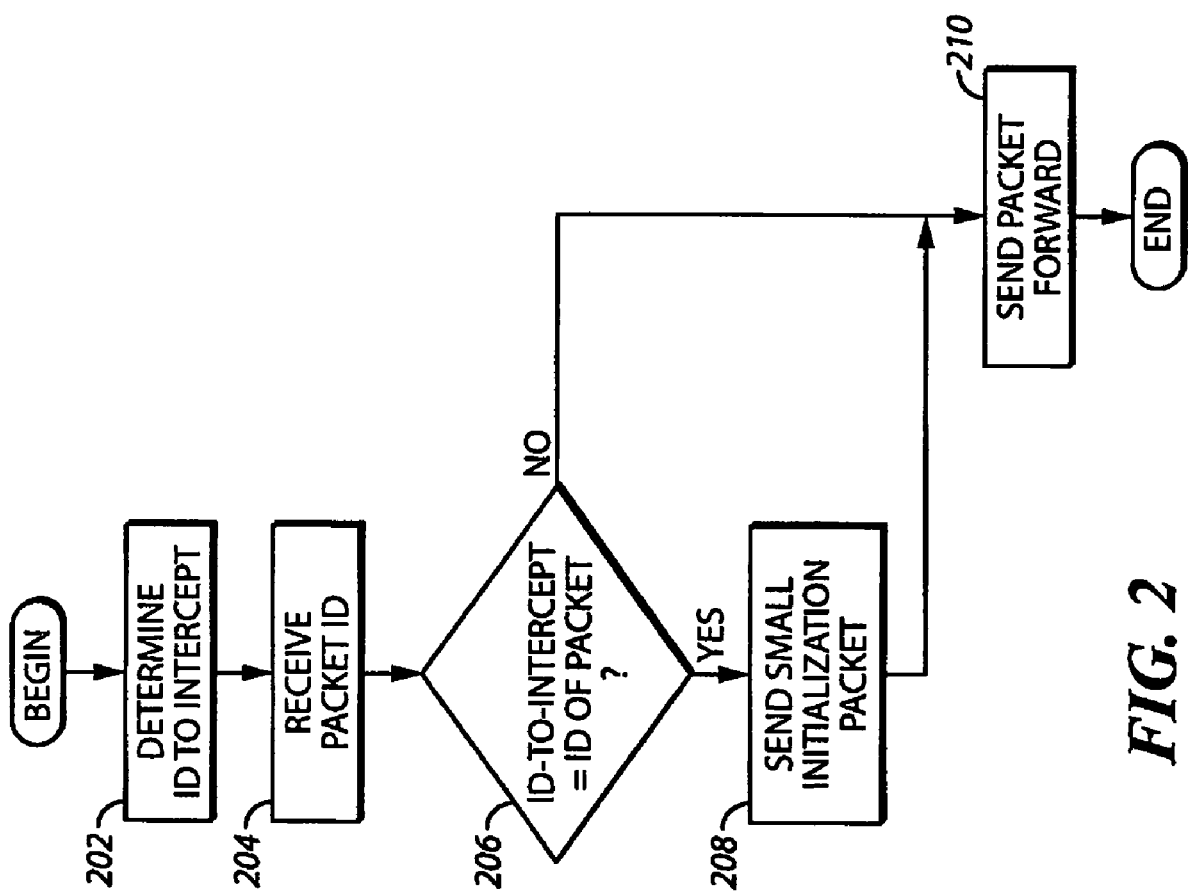
FIG. 2 is one approach for initiating communications between mobile stations according to the present invention.

Referring now to FIG. 2, one example of an approach for sending a small initialization packet in order to initialize or trigger communications in a network is described. At step 202, a network infrastructure element, for example, a Packet Control Function (PCF), determines the identities of packets to be intercepted. For example, the element may be programmed to look for certain packets having predetermined destinations. The predetermined destinations, for instance, addresses of target mobile stations, may be identified in a list that is stored at the element. Alternatively, other information in the packet such as the application type may be examined. In still other examples, characteristics of the packets (e.g., packet size) or system loading may be used to determine whether to send a short initialization packet.

At step 204, a packet is received. That packet includes an identifier indicating the target mobile station where the packet is to be sent. In one example, the identifier may be an Internet Protocol (IP) address or similar address structure. At step 206, a comparison is made between the identifier and the list of target mobile stations. If there is a match, then at step 208 a small initialization packet is sent to the target mobile station. The small initialization packet, in one approach, is transmitted over the paging channel (PCH). Control then continues at step 210 as described below. If there is not a match at step 206, the original packet is forwarded to the destination and/or processed as required at step 210.

Figure 3:
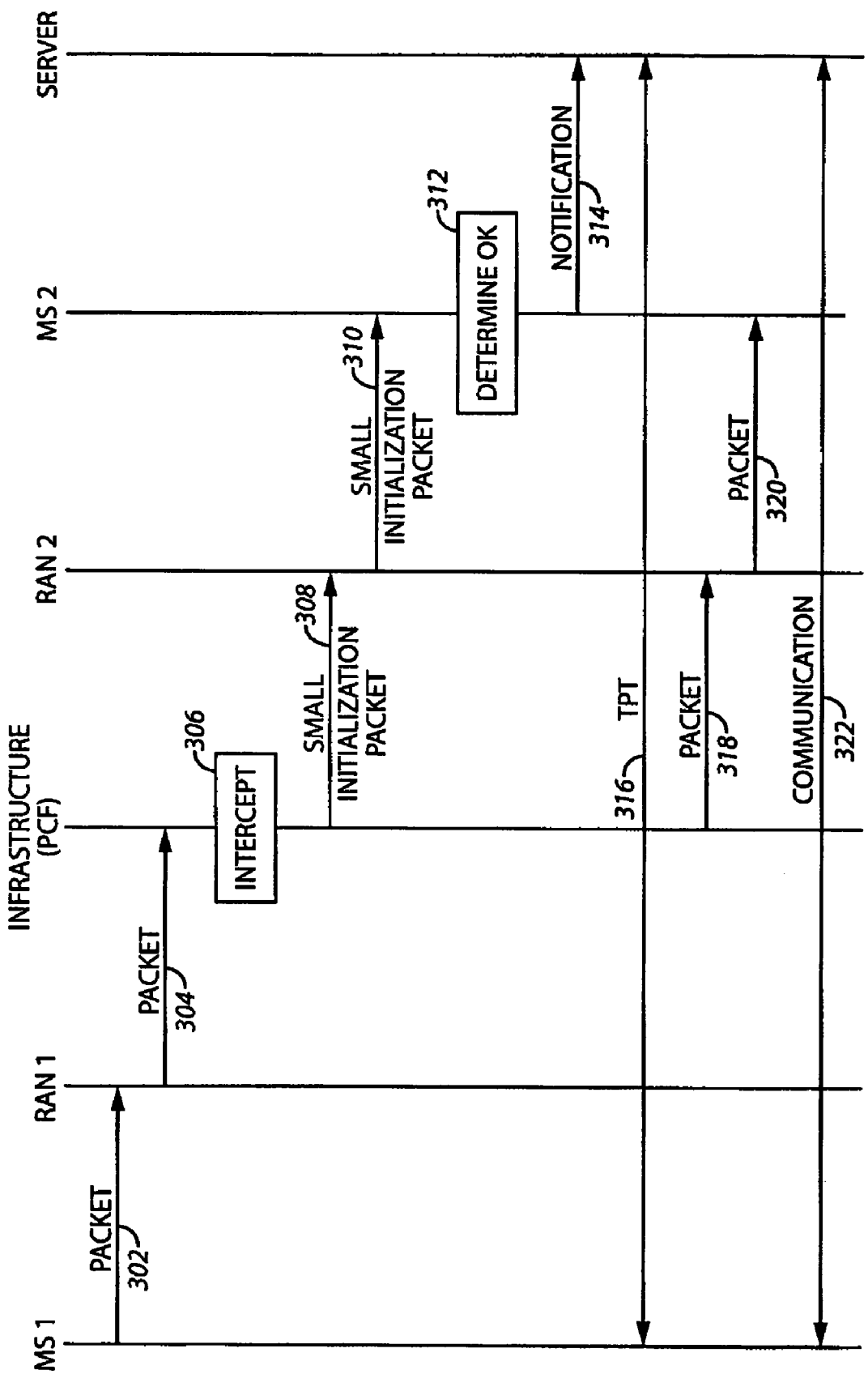
FIG. 3 is another approach for initiating communications between mobile stations according to the present invention.

Referring now to FIG. 3, another example of an approach for sending a small initialization packet to a target mobile station in order to initiate or trigger a communication session between mobile stations is described. At step 302, a packet is sent from a first mobile station (MS1) to a first Radio Access Network (RAN1). At step 304, the packet is sent from the first RAN (RAN1) to a Packet Control Function (PCF) within a telecommunication infrastructure. Alternatively, other elements within the infrastructure may perform the functions of the PCF.

At step 306, the PCF within the infrastructure may compare a predetermined list of packet identities to the destination contained in the packet received at step 304. For example, the PCF may maintain a list of target mobile stations for which packets are to be intercepted. Alternatively, the PCF may attempt to identify packets having a specific service type. For example, it may be determined if the service type is an e-mail service type. In still other examples, characteristics of the packets (e.g., packet size) or system loading may be examined.

At step 308, a match is determined and a small initialization packet is sent from the infrastructure to a second Radio Access Network (RAN2). In one example, a match may be made between a target mobile station address on the list and the destination identifier in the packet. In another example, the service type of the packet may match a pre-identified service type. At step 310, the small initialization packet is sent from the second RAN (RAN2) to a second mobile station (MS2), which is the target mobile station for the packet.

At step 312, it is determined by the second mobile station (MS2) that the small initialization packet is valid. At step 314, a notification message is sent to a server within the infrastructure. At step 316, a Talk Permit Tone (TPN) is transmitted to the first mobile station (MS1).

At step 318, the full packet (from step 304) is sent from the infrastructure to the second RAN (RAN2). At step 320, the packet is sent from the second RAN (RAN2) to the second mobile station (MS2). At step 322, a communication is exchanged between the first mobile station (MS1) and the second mobile station (MS2).

Figure 4:
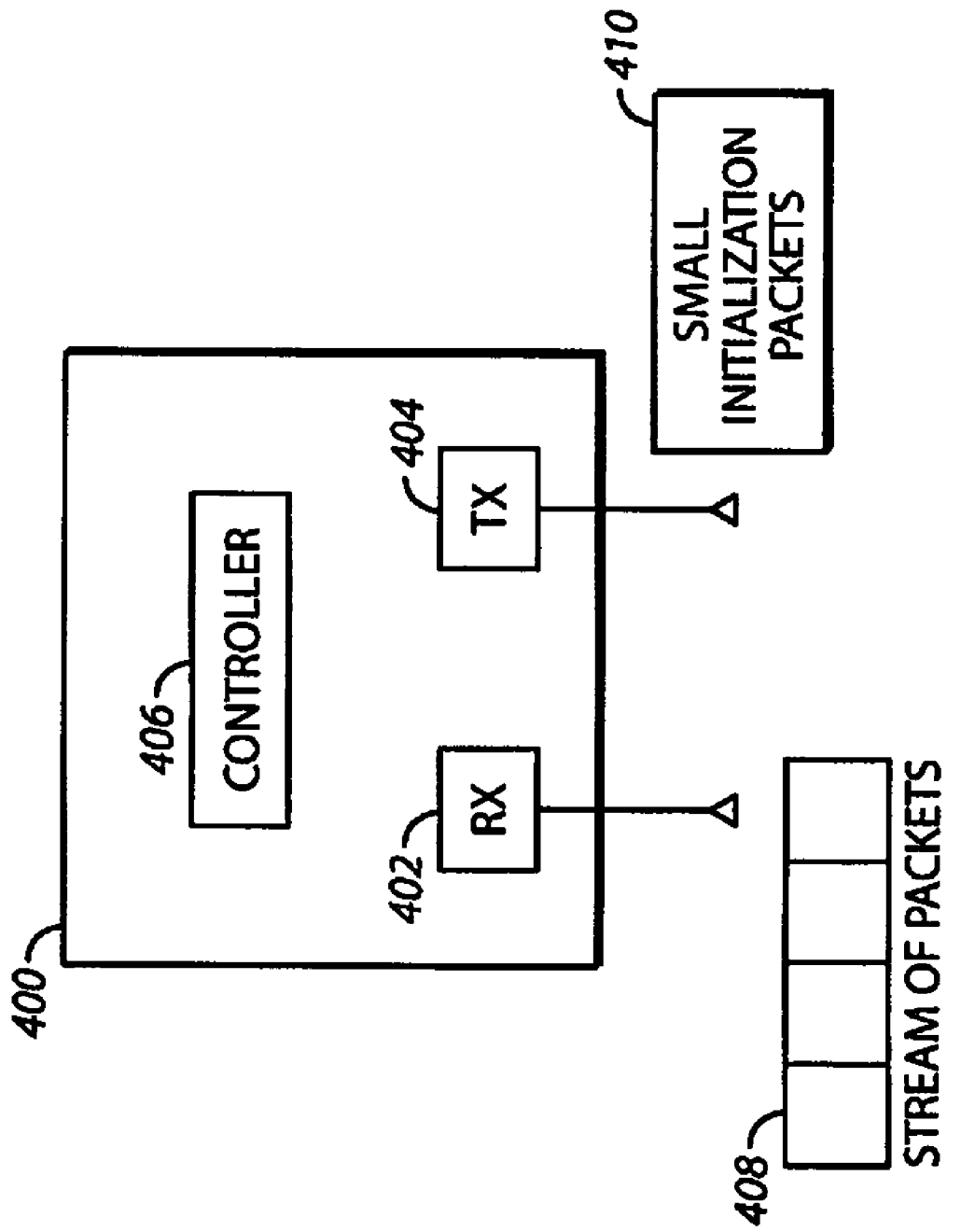
FIG. 4 is an example of a device for initiating communications between mobile stations according to the present invention.

Referring now to FIG. 4, one example of a device for sending a small initialization packet to a target mobile station is described. In one example, the device is a Packet Control Function (PCF) within a communication infrastructure. However, other devices may also be used in place of the PCF. The device includes a receiver 402, a transmitter 404, and a controller 406.

The controller 406 is programmed to monitor a stream of packets 408 at the input of the receiver 402. When a first packet is detected in the stream of packets 408 that is destined for a target mobile station, the first packet is intercepted at the input of the receiver 402, and subsequently, a small initialization packet 410 is transmitted to the target mobile station at the output of the transmitter 404. The small initialization packet 410 is structured to inform the target mobile station of an identity of the application that is initiating a communication session.

Thus, approaches are provided that minimize falsing in communication systems. The approaches described herein provide for the sending a small initialization packet to a target mobile station that is available to receive the packet. The approaches described herein are efficient and do not unduly consume system resources thereby enhancing user satisfaction with the performance of the system.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of establishing a communication session between an originating application and a target mobile station comprising:

monitoring a stream of packets; and when a first packet in the stream of packets is detected that is destined for a target mobile station, intercepting the first packet, determining a type of service associated with the stream of packets and subsequently sending a small initialization packet to the target mobile station only when the type of service is a predetermined type, the small initialization packet structured to inform the target mobile station of an identity of an originating application that is initiating a communication session with the target mobile station.

2. The method of claim 1 wherein sending a small initialization packet comprises sending a packet selected from a group comprising: a zero byte packet and a Reservation on packet.

3. The method of claim 1 wherein sending a small initialization packet comprises sending a paging message when the type of service is not the predetermined type.

4. The method of claim 1 wherein determining a type of service comprises determining a type of service selected from a group comprising: a Push-to-Talk (PTT) service and a cellular service.

5. A device for establishing a communication session between an originating application and a target mobile station comprising:

a receiver having an input;

a transmitter having an output;

a controller coupled to the receiver and the transmitter, the controller programmed to monitor a stream of packets at the input of the receiver, the controller being further programmed to, when a first packet is detected in the stream of packets that is destined for a target mobile station, intercepting the first packet at the input of the receiver, determining a type of service associated with the stream of packets and subsequently sending a small initialization packet to the target mobile station at the output of the transmitter only when the type of service is a predetermined type, the small initialization packet structured to inform the target mobile station of an identity of an application that is initiating a communication session.

6. The device of claim 5 wherein the small initialization packet is selected from a group comprising: a zero byte packet and a Reservation on packet.

7. The device of claim 5 wherein the controller is farther programmed to send a paging message when the type of service is not the predetermined type.

* * * * *